(12) United States Patent
Morales Rodriguez et al.

(10) Patent No.: US 10,723,263 B2
(45) Date of Patent: Jul. 28, 2020

(54) SPECIFIC COLOR GENERATION WITH MULTICOLOR LED FOR PRECISE COLOR BACKLIGHT ILLUMINATION APPLICATIONS

(71) Applicant: Continental Automotive Systems, Inc., Auburn Hills, MI (US)

(72) Inventors: Irving Morales Rodriguez, Guadalajara (MX); Antonio Corona Franco, Tlajomulco de Zuniga (MX); Marcela Fernandez, Zapopan (MX); Jose Francisco Richardt Osuna, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/182,776

(22) Filed: Nov. 7, 2018

(65) Prior Publication Data
US 2020/0139882 A1 May 7, 2020

(51) Int. Cl.
*H05B 37/02* (2006.01)
*B60Q 3/16* (2017.01)
*H05B 45/22* (2020.01)

(52) U.S. Cl.
CPC .............. *B60Q 3/16* (2017.02); *H05B 45/22* (2020.01)

(58) Field of Classification Search
CPC ............ H05B 33/0845; H05B 33/0848; H05B 33/086; H05B 33/0872; H05B 37/0227; H05B 37/0281; B60Q 1/14; B60Q 1/2603; B60Q 1/2696
USPC .................................. 315/77, 149, 307, 360
See application file for complete search history.

(56) References Cited

U.S. PATENT DOCUMENTS

| | | | |
|---|---|---|---|
| 7,718,942 B2 * | 5/2010 | Lim | H05B 45/37 250/205 |
| 9,736,895 B1 * | 8/2017 | Dong | H05B 45/46 |
| 2002/0171273 A1 | 11/2002 | Bar | |
| 2002/0171373 A1 | 11/2002 | Muthu | |
| 2007/0040512 A1 * | 2/2007 | Jungwirth | H05B 33/086 315/159 |
| 2008/0077363 A1 | 3/2008 | Abdulaev et al. | |
| 2008/0246419 A1 * | 10/2008 | Deurenberg | H05B 45/22 315/309 |
| 2010/0148675 A1 * | 6/2010 | Meijer | H05B 33/0803 315/152 |
| 2012/0299476 A1 * | 11/2012 | Roberts | B60Q 1/0011 315/77 |
| 2018/0014368 A1 * | 1/2018 | Radermacher | H05B 33/0824 |

OTHER PUBLICATIONS

European Patent Office Search Report dated Feb. 20, 2020 for the corresponding European Patent No. 19206377.4.

* cited by examiner

*Primary Examiner* — Tung X Le

(57) ABSTRACT

The color generated by two differently-colored LEDs is maintained over time and different temperatures by sensing their combined output color using two phototransistors having different spectral sensitivities the output voltages of which are correlated to a desired output color. As the combined output color changes, the phototransistors' output voltages will change. The currents provided to the LEDs can thereafter be adjusted to maintain the output voltages and thus maintain the combined output color.

14 Claims, 4 Drawing Sheets

| ALGORITHM COLOR SWEEP STEPS | RED LED DUTY CYCLE(%) | GREEN LED DUTY CYCLE(%) | BI-COLOR LED RESULTING COLOR EXAMPLE | RESULTING WAVELENGTH |
|---|---|---|---|---|
| 1 | 100 | 0 | 100 | 650 |
| 2 | 95 | 5 | 95 | 641 |
| 3 | 90 | 10 | 90 | 632 |
| 4 | 85 | 15 | 85 | 623 |
| 5 | 80 | 20 | 80 | 614 |
| 6 | 75 | 25 | 75 | 605 |
| 7 | 70 | 30 | 70 | 596 |
| 8 | 65 | 35 | 65 | 587 |
| 9 | 60 | 40 | 60 | 578 |
| 10 | 55 | 45 | 55 | 573 |
| 11 | 50 | 50 | 50 | 585 |
| 12 | 45 | 55 | 45 | 578 |
| 13 | 40 | 60 | 40 | 572 |
| 14 | 35 | 65 | 35 | 565 |
| 15 | 30 | 70 | 30 | 559 |
| 16 | 25 | 75 | 25 | 552 |
| 17 | 20 | 80 | 20 | 546 |
| 18 | 15 | 85 | 15 | 539 |
| 19 | 10 | 90 | 10 | 533 |
| 20 | 5 | 95 | 5 | 526 |
| 21 | 0 | 100 | 0 | 520 |

FIG.3

SPECIFIC COLOR GENERATION WITH MULTICOLOR LED FOR PRECISE COLOR BACKLIGHT ILLUMINATION APPLICATIONS

It is well-known that two primary colors can be combined to generate a new third color between the two primary colors. Primary-color LEDs are can therefore be used to generate different colors in a vehicle instrumentation panel, which is also more commonly known as a dashboard." Unfortunately, the color output from an LED changes with age and temperature. An apparatus and method to generate a consistent color from the combination of two primary-colored LEDs would be an improvement over the prior art.

BRIEF DESCRIPTION OF THE FIGURES

FIG. 3 is a table of relative colored light output from the two color LEDs of the dummy tri-color LED.

DETAILED DESCRIPTION

As used herein, the term "tri-color" LED refers to, two LEDs that have independent electrical connections (anode and cathode) or, a common cathode connection but in the same package, or two LEDs that are totally independent (different package and electrical connections). The two LEDs color could be red, green, blue or any color (e.g. green and red). By turning one or both LED's on and varying the current provided to them, the color produced by their combined light output can be red, green, orange or yellow or other colors. To obtain a full range of colors a blue LED could be added to form an RGB LED, referred to herein as a multi-color LED.

Figure 1:
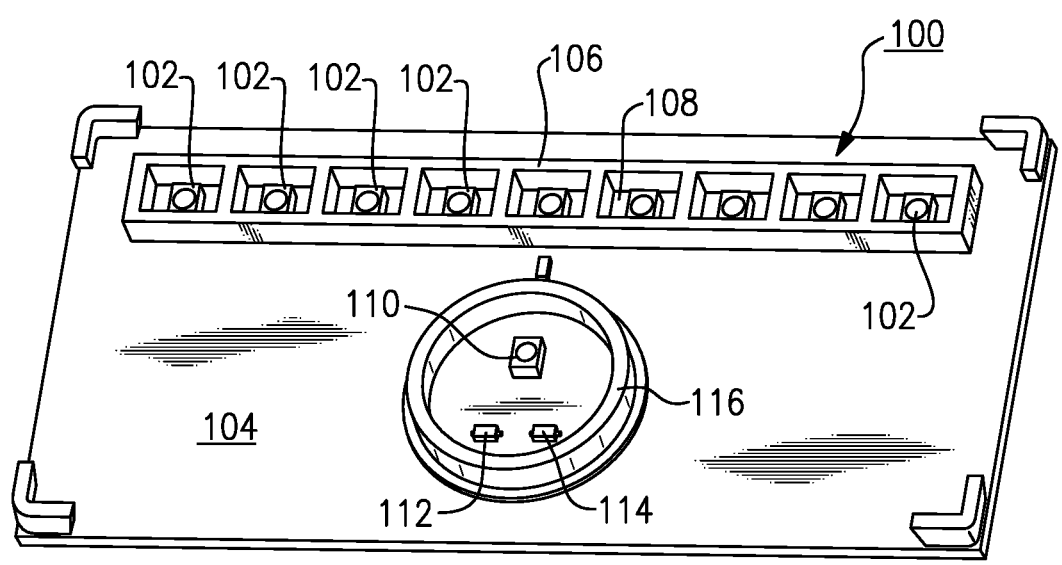
FIG. 1 depicts a circuit board having multiple, tri-color LEDs that provide precise backlight illumination and which also has a "dummy" tri-color LED and two phototransistors that monitor the light that is output from the dummy LED.

FIG. 1 depicts an apparatus 100 for providing precise color backlight illumination to a motor vehicle dashboard. The apparatus 100 comprises a conventional circuit board 104, attached to which are several tri-color LEDs 102. The tri-color LEDs 102 are inside or surrounded by small, shallow compartments 108. Each compartment is 108 is part of a plastic multi-compartment frame 106, which is also attached to the circuit board 104.

In the preferred embodiment, if the tri-color LEDs 102 have a red LED and a green LED, the electrical connections (anode and cathode) can be independent to provide more flexibility to the circuit topology. The anode/cathode for the first color LED and the anode/cathode for the second color LED are electrically isolated from each other such that the LEDs can be energized separately. Providing a voltage to the first color LED anode will turn the first color LED on but will not turn on the second color LED. Similarly, providing a voltage to the second color LED anode will turn the second color LED on but will not turn on the first color red LED. The intensity of the colors emitted from the LEDs can thus be varied with the amount of current passing through each LED. By adjusting the current through the two LEDs, the combination color emitted from them can thus be changed as shown in the color combination chart in FIG. 3.

Those of ordinary skill in the art know that a phototransistor has a non-linear spectral sensitivity. In FIG. 1, the circuit board 104 also supports a "dummy" LED 110 and two phototransistors 112 and 114, which are located close to, e.g., adjacent to, the dummy LED 110 and inside a second, substantially cylindrical compartment 116. The phototransistors 112 and 114 in the compartment 116 are selected to have different spectral sensitivities, e.g., they generate output voltages that differ from each other when they are subject to the same color and same intensity light. The output voltages generated at their respective emitters will be different when they are exposed to the same light from the dummy LED 110. If the dummy tri-color LED 110 has the same or at least substantially the same electrical and physical characteristics of the tri-color LEDs in the compartments, the phototransistors' outputs can be used to "test" or monitor the color generated by the dummy LED 110 and thus provide signals by which the current provided to the constituent green and red LEDs can be adjusted over time in order to maintain the color output from the dummy LED 110 as well as the main tri-color LEDs 102.

Figure 2:
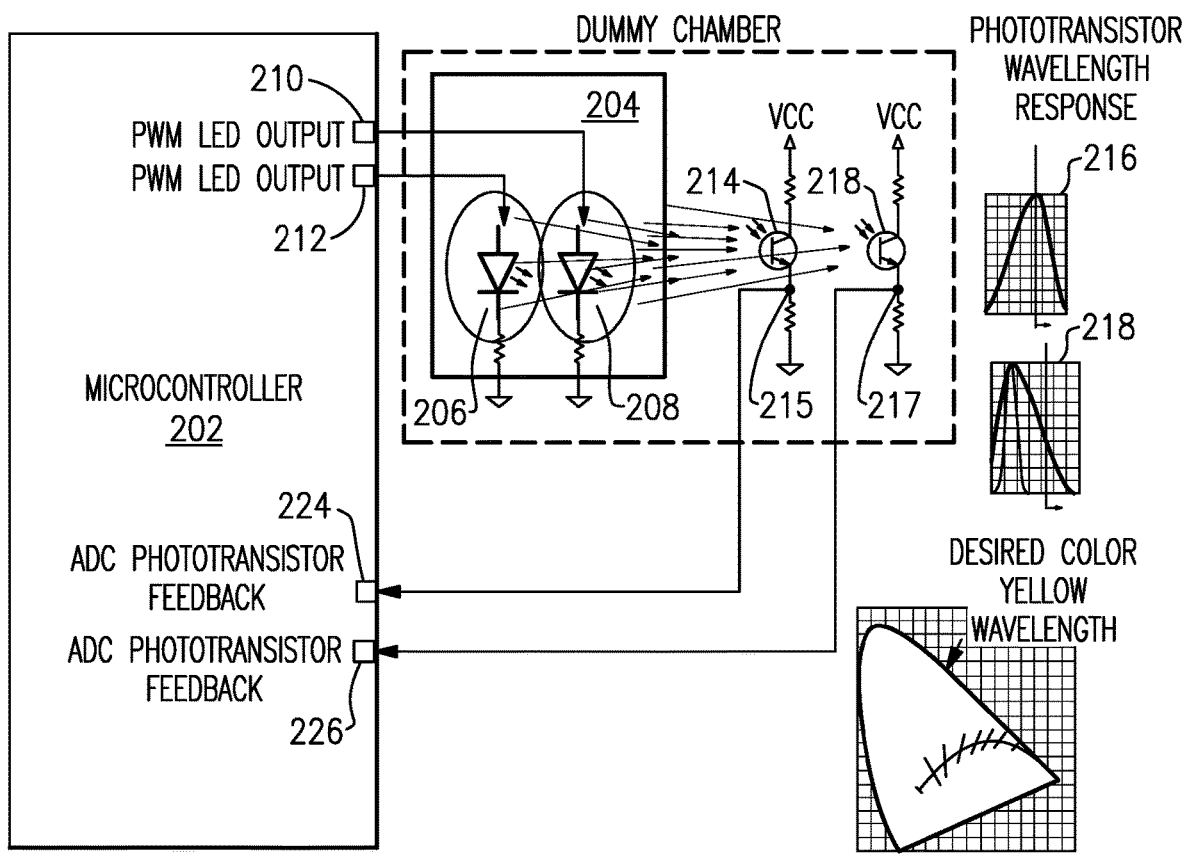
FIG. 2 depicts a schematic diagram of a circuit to monitor the colors of light that is output from two LEDs that comprise a tri-color LED and which can maintain color consistency.

Referring now to FIG. 2, a circuit 200 for monitoring and controlling the color generated by the tri-color LEDs 102 comprises a controller 202 (a microprocessor or microcontroller) having a "first" output terminal 210 electrically connected to the anode of the first color (e.g. red) LED 206 of a tri-color dummy LED 204. A second output terminal 212 is connected to the anode of a second color (e.g. green) LED 208 of the tri-color dummy LED 204.

As shown in FIG. 1, the tri-color dummy LED 204 is preferably located as close as possible to the phototransistors 214 and 218, the respective spectral sensitivities of which are respectively illustrated in accompanying graphs 216 and 220.

In the preferred embodiment, the first output terminal 210 of the controller 202 is a pulse width modulated signal, the duty cycle of which is controlled by the controller 202 to effectively change the current provided to the corresponding LED. Similarly, the second output terminal 212 is a pulse width modulated signal, the duty cycle of which is also controlled by the processor 202 to effectively change the current provided to the corresponding LED. Controlling the duty cycles of the signals provided to the LEDs 206 and 208 effectively controls the intensity of the light output from each LED and thus the color of the light emitted from the combination of the two colors emitted from the dummy LED.

In the preferred embodiment, the signals output from the controller 202 to the LEDs 206 and 208 are adjusted until a desired combined color is created by (output from) the tri-color LED 204. The voltages output from the emitters 215, 217 of the phototransistors 214 and 218 at the desired or selected color are read or obtained by the controller through two corresponding input terminals 222 and 224. (Analog-to-digital converters that are of course required to convert the analog voltages generated by the phtototransistors to a digital form are omitted from the figure in the interest of brevity.) As the first and second color (e.g. red and green) LEDs of the tri-color dummy LED 204 age and their output colors and intensity change, the controller adjusts the signals provided to the red and green LEDs 206 and 208 to maintain the voltages output from the emitters 215, 217 of the corresponding phototransistors. Stated another way, the controller adjusts the duty cycle of the PWM to select the desired intensities of the light output from the first color LED 206 and the light output from the second color LED 208 to maintain a continuous and stable or precise color.

In the same way, the electrical current provided to the first color (e.g. red) LED and the second color (e.g. green) LED of each tri-color LED 102 is maintained in the same way. Since the tri-color LEDs 102 and the dummy LED 110 are selected from the same manufacturing lot, and the PWM and duty cycle are set as the dummy LEDs, the color generated by each of the LEDs 102 in each compartment 108 can be maintained at a substantially constant color and substantially constant intensity regardless of the temperature inside the motor vehicle and regardless of the age of the LEDs.

In the preferred embodiment, the controller, which is electrically coupled to both phototransistors 214 and 218 and electrically coupled to both LEDs 206 and 208, provides a first amount of current to the first color (e.g. red) LED and a second amount of current to the second color (e.g. green) LED. The processor then measures the output voltages from both phototransistors. The processor changes at least one of the currents provided to the second color (e.g. green) LED and the first color (e.g. red) LED until the output voltages from the first and second phototransistors are substantially equal to previously-obtained output voltages from those same phototransistors.

Figure 4:
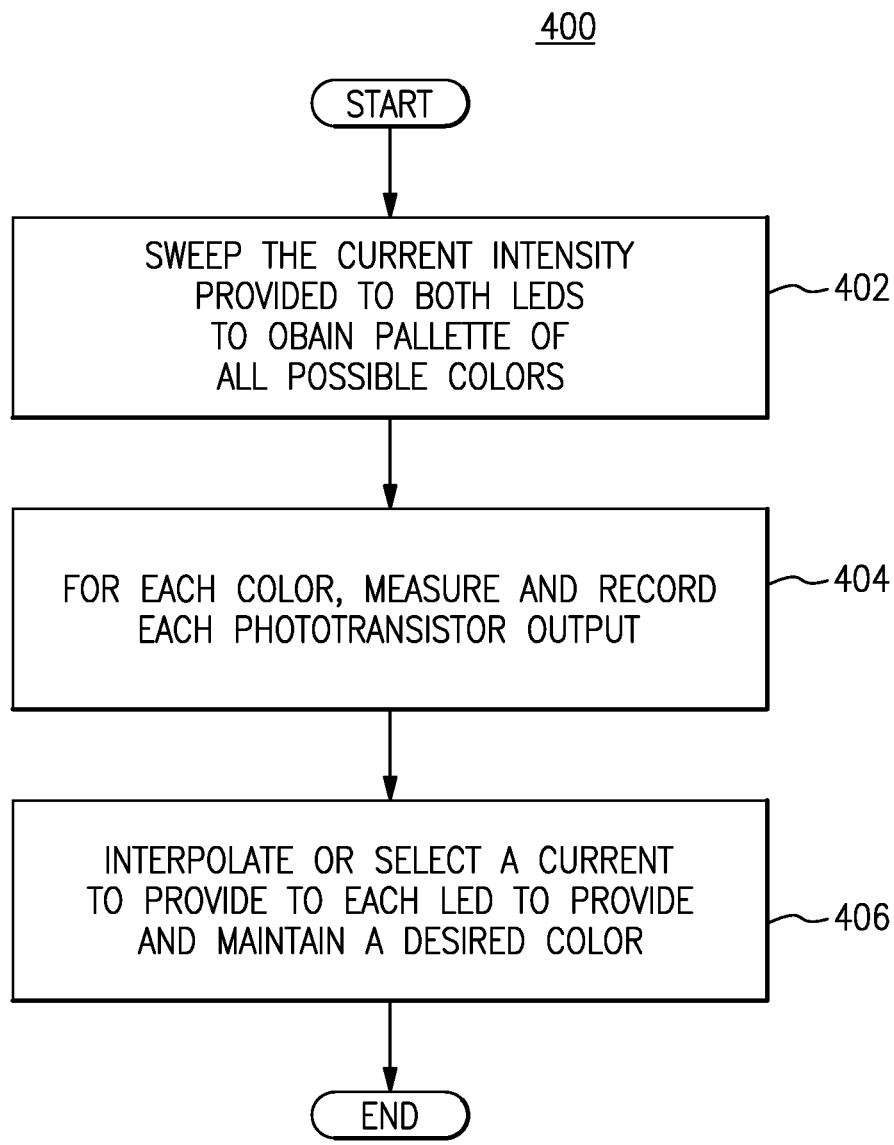
FIG. 4 depicts steps of a method of controlling color generated by combining light emitted from two, differently-colored LEDs.

Referring now to FIG. 4, a method 400 of controlling the color generated by combining light emitted from two, differently-colored LEDs.

In a first step 402, the current intensity provided to both LEDs is "swept" to obtain all possible combinations of combined colors. At a second step 404, the output voltage from each phototransistor is measured and recorded and placed into a table. At a third step 406, the voltages output from the phototransistors are interpolated and the corresponding current provided to each LED generated to obtain combinations of light intensities desired from the two different-colored LEDs. The steps of sweeping current intensities, measuring and recording output voltages and interpolating output voltages is repeated over time in order to maintain a calibrated color that will be generated from the two different color LEDs when combined.

Those of ordinary skill in the art should recognize that the apparatus and method disclosed herein can work with any number of different color LEDs. Accordingly, the foregoing description is for purposes of illustration only. The true scope of the invention is set forth in the following claims.

What is claimed is:

1. An apparatus for controlling color generated by combining the light emitted from first and second differently-colored light emitting diodes (LEDs), the first LED generating a first nominal color having an intensity that varies responsive to the amount of current flowing through the first LED, the second LED generating a second nominal color that is different than the first nominal color, the second LED having an intensity that varies responsive to the amount of current flowing through the second LED, the color of light generated by combining light from the first LED and light from the second LED together being a third color, the third color varying responsive to the intensities of the colors emitted from the first and second LEDs, the apparatus comprising:

a circuit board with a multi-compartment frame, wherein each of the first LED and the second LED are disposed within a common compartment of the multi-compartment frame;

a second compartment separate from compartments within the multi-compartment frame;

a tri-color LED disposed within the second compartment;

a first phototransistor disposed within the second compartment and optically coupled to the single tri-color LED, the first phototransistor having a first spectral sensitivity and generating an output voltage having a magnitude that varies responsive to the wavelength of light impinging on the first phototransistor from the single tri-color LED; and a second phototransistor disposed within the second compartment and optically coupled to the single tri-color LED, the second phototransistor having a second spectral sensitivity that is different than the first spectral sensitivity and generates an output voltage having a magnitude that varies responsive to the wavelength of light impinging on the second phototransistor from both LEDs;

wherein the magnitudes of the output voltages output from the first and second phototransistors for a particular wavelength of light are different.

2. The apparatus of claim 1, further comprising:

a controller electrically coupled to both the first phototransistor and the second phototransistor and electrically coupled to the first LED, the second LED and the single tri-color LED;

a non-transitive memory device coupled to the controller and storing program instructions, which when executed cause the controller to:

provide a first amount current to the first LED;

provide a second amount current to the second LED;

measure a first output voltage from the first phototransistor;

measure a second output voltage from the second phototransistor; and change at least one of the first amount current and the second amount current until the output voltage from the first phototransistor and output voltage from the second phototransistor are substantially equal to previously obtained first and second output voltage values.

3. The apparatus of claim 2, wherein the first output voltage from the first phototransistor and the second output voltage from the second phototransistor are indicative of a light emitted from the tri-color LED disposed within the second compartment, wherein the first output voltage from the first phototransistor is different than the second output voltage from the second phototransistor based on being exposed to the same light emitted from the tri-color LED.

4. The apparatus of claim 1, wherein the first LED generates light that is a first color and wherein the second LED generates light that is a second color different than the first color, the apparatus further comprising:

a plurality of pairs of the first LED and the second LED;

wherein the controller is coupled to and providing current to each of the plurality of first LED and each of the second LED of the plurality of pairs of the first LED and the second LED;

wherein the current provided to each of the first LED is substantially the same as the current provided to the second LED.

5. The apparatus of claim 4, wherein each of the plurality of pairs of the first LED and the second LED are disposed within a separate compartment of the multi-compartment frame.

6. The apparatus of claim 5, wherein the first LED is a red LED and the second LED is a green LED.

7. The apparatus of claim 6, wherein the first LED and the second LED are electrically isolated from each other such that each of the first LED and the second LED may be separately energized.

8. A method of controlling color generated by combining light emitted from first and second differently-colored light emitting diodes (LEDs), the first LED generating a first nominal color having an intensity that varies responsive to the amount of current flowing through the first LED, the second diode generating a second nominal color that is different than the first nominal color, the second color having an intensity, which varies responsive to the amount of current flowing through the second LED, the color of light generated by combining light from the first LED with light from the second LED being a third nominal color, which varies responsive to the intensities of the colors emitted from the first LED and the second LED, the method comprising:

sweeping, with a controller, the current provided to a tri-color LED disposed in a compartment separate from the first LED and the second LED to obtain combinations of possible colors available by the light provided by combining light from both first LED, the second LED and the tri-color LED;

measuring and recording, with the controller, the output voltages from a first phototransistor and a second phototransistor responsive to light received from the tri-color LED disposed within the compartment, wherein the first phototransistor and the second phototransistor have different spectral sensitivities;

interpolating, with the controller, voltages output from the first phototransistor and the second phototransistor to obtain combinations of light colors and intensities output from the tri-color LED that are required to generate a desired third color by combining light from the first LED and the second LED.

9. The method of claim 8, further comprising:

repeating the steps of sweeping, measuring, recording and interpolating at predetermined intervals over time to maintain a calibrated color that is to be generated by combining light from the first LED and the second LED.

10. The method of claim 9, including seeping, measuring, recording and interpolating at predetermined interfaces light from the tri-color LED within the compartment to maintain the calibrated color that is generated by combining light from the first LED and the second LED.

11. The method of claim 8, including mounting the first LED and the second LED as pairs of LEDs within corresponding compartments of a multi-compartment frame mounted to a circuit board.

12. The method of claim 11, wherein the compartment including the tri-color LED is separate and isolated from the compartments in the multi-compartment frame.

13. The method of claim 8, wherein the tri-color LED includes the same electrical and physical characteristics as the first LED and the second LED.

14. The method of claim 8, including outputting a voltage from the first phototransistor that is different than a voltage output from the second phototransistor in response to the same light output from the tri-color LED.

\* \* \* \* \*